United States Patent
Huang et al.

(10) Patent No.: US 10,686,726 B2
(45) Date of Patent: Jun. 16, 2020

(54) METHOD FOR OPTIMIZING RESOURCE LOADING AT MOBILE BROWSERS BASED ON CLOUD-CLIENT COOPERATION

(71) Applicant: Peking University, Beijing (CN)

(72) Inventors: Gang Huang, Beijing (CN); Xuanzhe Liu, Beijing (CN); Yun Ma, Beijing (CN); Xinyang Wang, Beijing (CN); Yi Liu, Beijing (CN); Mengwei Xu, Beijing (CN); Meihua Yu, Beijing (CN)

(73) Assignee: Peking University, Beijing (CN)

( * ) Notice: Subject to any disclaimer, the term of this patent is extended or adjusted under 35 U.S.C. 154(b) by 0 days.

(21) Appl. No.: 15/743,018

(22) PCT Filed: Sep. 7, 2016

(86) PCT No.: PCT/CN2016/098289
§ 371 (c)(1),
(2) Date: Jan. 9, 2018

(87) PCT Pub. No.: WO2017/107568
PCT Pub. Date: Jun. 29, 2017

(65) Prior Publication Data
US 2018/0287960 A1 Oct. 4, 2018

(30) Foreign Application Priority Data

Dec. 21, 2015 (CN) .......................... 2015 1 09641710

(51) Int. Cl.
*H04L 12/911* (2013.01)
*H04L 29/08* (2006.01)
(Continued)

(52) U.S. Cl.
CPC ............. *H04L 47/82* (2013.01); *G06F 9/445* (2013.01); *G06F 9/50* (2013.01); *H04L 29/08* (2013.01);
(Continued)

(58) Field of Classification Search
CPC ......... H04L 67/06; H04L 67/18; H04L 67/36; H04L 45/302; H04L 45/308
See application file for complete search history.

(56) References Cited

U.S. PATENT DOCUMENTS

| 5,673,322 | A  | * | 9/1997  | Pepe ........................ H04L 63/02 705/52 |
| 6,959,318 | B1 | * | 10/2005 | Tso ....................... G06F 16/9574 709/203 |

(Continued)

*Primary Examiner* — John M Macilwinen
(74) *Attorney, Agent, or Firm* — SV Patent Service

(57) ABSTRACT

The invention discloses a resource optimization method for a mobile browser based on cloud-client cooperation. The present method includes: 1) set up a proxy server on the user's mobile terminal, set up a cloud server on the user's personal cloud; 2) mobile terminal proxy server receives and resolves the URL request from the browser, and if the mobile terminal proxy server resources have been cached URL corresponding to the request, or calculated by the URL matching algorithm there is a corresponding resource, the process directly returns the resource to the browser; otherwise, it sends the request to the cloud server; 3) the cloud server checks if the resource corresponding to the URL in the request has been cached; if the resource is cached, returning the resource to the proxy server; otherwise sending a request to the target website corresponding to URL in the resource request and returning the results to the proxy server; and 4) returning the result received by the proxy server to the browser in accordance with the structure of the HTTP response. The invention greatly improves the loading speed.

6 Claims, 1 Drawing Sheet

(51) Int. Cl.
*G06F 9/445* (2018.01)
*G06F 9/50* (2006.01)
*H04L 29/06* (2006.01)
*H04W 88/02* (2009.01)

(52) U.S. Cl.
CPC ............ *H04L 67/02* (2013.01); *H04L 67/146* (2013.01); *H04L 67/2842* (2013.01); *H04L 67/327* (2013.01); *H04L 69/22* (2013.01); *H04W 88/02* (2013.01)

(56) References Cited

U.S. PATENT DOCUMENTS

| | | | | |
|---|---|---|---|---|
| 7,519,726 B2 * | 4/2009 | Palliyil | ............... | G06F 16/9014 709/232 |
| 2014/0323127 A1 * | 10/2014 | Evans | .................... | H04W 8/06 455/435.1 |
| 2015/0134917 A1 * | 5/2015 | P | ......................... | G06F 16/172 711/144 |

* cited by examiner

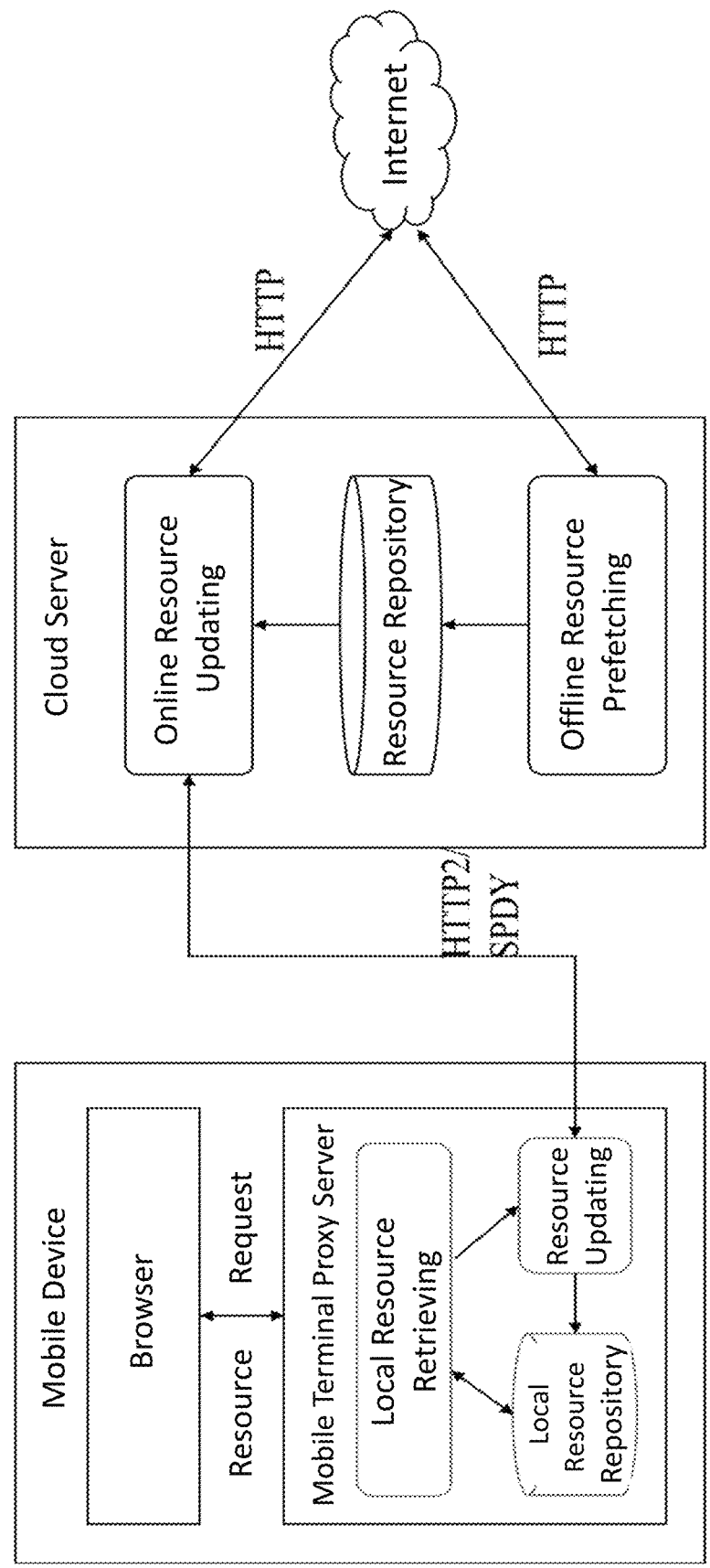

METHOD FOR OPTIMIZING RESOURCE LOADING AT MOBILE BROWSERS BASED ON CLOUD-CLIENT COOPERATION

TECHNICAL FIELD

The present invention relates to the field of computer software technology, and in particular, to a method for optimizing resource loading at a mobile browser based on cloud-client cooperation.

BACKGROUND OF THE INVENTION

According to China Internet Network Information Center released in January 2015, "the 35th China Internet Development Statistics Report Network", as of December 2014, the scale of China's mobile phone users has reached 557 million, accounting for 85.8% of the Internet user population. For several years in a row, the scale of mobile Internet users has maintained steady growth, and mobile phones have long become the number one Internet terminal.

As more and more people are using their cell phones or tablets to surf the web over Wi-Fi or 3G networks, Web browsers have become one of the most commonly used applications on mobile devices. According to research, browsers account for 63% of mobile devices' display time. However, the user experience of existing mobile browsers is far from satisfactory. Resource loading is one of the important factors that affect the performance of the browser. Experiments show that the time it takes to load the webpage is 65% of the time spent on resource loading. This problem is compounded by the often unsatisfactory network conditions of mobile devices, in particular the possibility of network congestion or user movement. In addition, the process of downloading resources itself consumes a lot of power, which is precisely the scarcest resource on mobile devices.

In order to speed up Web resource loading, the caching mechanism is widely used. Through the caching method, users can reduce resource downloads, thereby improving Web browsing performance. This caching mechanism offers more benefits for mobile devices as it not only reduces page load times but also reduces network traffic and battery consumption on mobile devices. However, in practice, caching is often not well configured and implemented. Studies have shown that there is a big gap between the theoretical performance and the actual performance of the caching mechanism. Therefore, there is a current need to optimize the existing caching mechanism and improve the caching without changing the existing browser and server implementations. It is desirable to further enhance the experience of mobile device users in surfing the web and reduce the user's traffic and power consumption.

SUMMARY OF THE INVENTION

In view of the existing problems in conventional technologies, an object of the present invention is to provide a resource loading optimization method for a mobile browser based on cloud-client cooperation. Under the present invention without changing existing user browsing habits and Web application cache configuration of the original premise, to minimize transport traffic Web resources and improve loading speed. The core idea is: based on the original Web application architecture, setting up a proxy server on the mobile terminal and pre-fetching Web resources by using a cloud server, in other words, and changing the existing two-tier architecture from browser to server into a four-tier architecture.

The system is to set up an HTTP proxy on the mobile terminal side, and configure the mobile client browser to use the HTTP proxy; set up a cloud server for each individual mobile phone user in the cloud. The mobile terminal proxy server receives the request of the mobile terminal browser and returns the resource response to the mobile terminal browser. Instead of directly requesting resources from the Internet, the mobile terminal proxy server requests resources from a cloud server built on the personal cloud, and the cloud server downloads resources from the Internet and selectively sends the resources to the mobile terminal. In this process, the URL matching algorithm, resource checksum comparison, data compression and prefetching are used to minimize the purpose of improving traffic flow and loading speed.

The technical scheme of the invention is as follows:

A cloud-client collaborative method for optimizing resource loading at mobile browser, the specific steps are as follows:

1) Establishing a proxy server on the mobile terminal (e.g. a mobile phone). The proxy server can receive the browser's request, and parses the request. If the proxy server has cached the URL request corresponding to the resource, or a corresponding existing resource has been calculated by a URL matching algorithm, returning the resource directly to the browser; if the resource is not stored locally, the URL request is sent to the cloud server.

2) Establishing a cloud server for each mobile terminal in the cloud. The cloud server may be an Internet connection. The cloud server can prefetch resources, and receive a resource request from the mobile-terminal side of the proxy server. If the resource has already been cached on the cloud server, the cloud server returns the resource directly to the mobile terminal proxy server. If not, the request is sent to a target website and the result is returned.

3) The user configures the browser proxy configuration in the mobile terminal as the proxy server of the mobile terminal.

Further, each resource will calculate the checksum value of the file server in the cloud, based solely on the content of the resource identifier, resource cache may be retrieved according to the value. When the server-side resources are sent back to the mobile-terminal side, the mobile terminal proxy will first retrieve the file if the checksum value already exists in the cache of the mobile phone side, if already present, only to return the checksum value of this resource, the mobile terminal according to the proxy server checksum value extraction resources.

Further, the cloud server periodically prefetches sites that may be accessed by the user, and establishes the cache of the website in advance for user access.

Further, all server-to-mobile transmissions are compressed to save transmission of uncompressed resources.

Using the framework of the present invention, resource access mainly involves three steps:

1. Prefetch Target Resource: The cloud server periodically prefetches resources that users may access.

2. Receiving a browser request and check caching on the mobile terminal: mobile-terminal-side proxy server receives a browser request, if the mobile terminal has not cached resources, then request resources from the cloud server; if the cache exists locally, or the appropriate resources is found based on URL matching algorithm, directly returns the resource to the browser.

3. Checking cache on the cloud-server side: If the cloud server has not cached the resource, sending a request to the original website, and then returning the resource back to the proxy server on the mobile-terminal side. The proxy server on the mobile-terminal side sends the result back to the browser according to the structure of the HTTP response.

The specific technical solutions of the above steps are as follows:

1. Prefetching the target resource: the server prefetches the resources that the user may access. The specific resource list is generated according to the user's visiting habits. For the prefetched resources, the server calculates the checksum value, and arranges the entries in the database.

2. The proxy server receives the request and checks caching on the mobile browser-side: The present invention may be used in conjunction with the original browser's cache. The browser can send resources, which is originally required to request from a remote server, to the proxy server on the mobile terminal. The proxy server on the mobile terminal receives and resolves the request according to the HTTP protocol. Afterwards, it is checked if the resource has been locally cached by the proxy server on the mobile terminal. If the cache is not present, the mobile terminal queries the resolved resource URL in a cache list using a URL matching algorithm. If the query has found the relevant resource, the resource is returned; otherwise the request for resource is sent to the server based on HTTP 2 or SPDY protocol.

The URL matching algorithm consists of two parts, URL pattern recognition and URL matching query, wherein the pattern recognition is conducted on the cloud server side, and the URL matching query is processed on the mobile-terminal side.

The cloud server crawls and parses the same site of timing periodically to obtain a list corresponding to the URL and resources. There may be multiple URLs for a same resource. The purpose of this algorithm is to search for potentially corresponding resources based on URLs, and therefore, a URL pattern corresponding to each resource needs to be established. Firstly, a URL based on common delimiters segmentation URL, for the same resources, is calculated when each part of the URL is changed. The probability value that the resource remains constant is referred to the paragraph key coefficient, which is calculated as:

the paragraph key coefficient=(the number of occurrences of the paragraph)/(the total number of URLs corresponding to the same resource+1).

For all resources, the value for the paragraph key coefficient is between 0 and 1.

When the server resources with its URL is sent back to the mobile-terminal side, the URL of the paragraph key coefficients for all paragraphs are returned back.

When the proxy server on the mobile-terminal side receives a request for a URL, it will be matched to a query, the URL similarity is compared with the corresponding record of all URL website (first find the site based on the URL, then all the websites URL records for comparison), the similarity is calculated as follows:

$$similarity = \prod_{i=each\ paragraph\ in\ the\ URL} (1 - paragraph\ key\ coefficient_i * \alpha_i)$$

wherein the sum is over all paragraph i at the URL, where $\alpha_1$ indicates whether the paragraph at the URL to be requested in the search matches the paragraph of the target URL, 1 if not matched, and 0 if matched. In particular, when the request URL and the target URL are exactly the same, the similarity is 1. When the the similarity is greater than 0.5, the target URL resource is considered to be a resource URL requested, and the results take maximum similarity as a resource to be requested URL. If the similarity values are all less than 0.5 for all the resources, the match is considered to have failed. The cache does not include the resource, the request is sent to the server for further confirmation.

3. Checking the server-side cache: after the cloud server has received the resource request from the mobile-terminal side, it calculates a database entry corresponding to the URL according to the relevant algorithm. If URL is not in the database, the resource is not cached. If the resource is not cached, the server requests the resource from the original website, to obtain the resource. A checksum value of the resource will be calculated and an entry will be stored in the database.

4. Checking whether the resource exists on the mobile terminal and sending a response to the browser: after the cloud server has prepared the resource, it checks if the resource exists in the resource list on the proxy server according to the resource checksum value. If the resource exists in the resource list, the cloud server does not return the data body, but only returns the corresponding checksum value of the resource. The mobile terminal will extract the corresponding resource from the local list according to the checksum value.

If the resource does not exist, the server compresses the resource and returns the content to the mobile terminal via HTTP 2 or SPDY protocol. The mobile terminal receives the data and decompresses data, and obtains a response to the resource according to HTTP response standard, and finally sends the corresponding response back to the browser.

The present invention has the following positive effects compared with the conventional technologies:

The invention optimizes web browsing through a four-layer architecture, which can reduce transmission traffic and increase loading speed. Experiments show that using this framework, users can save 17% of the traffic and 29% of the loading speed on the first visit to webpages; the traffic can be saved by 66% on average and the loading speed can be increased by 9% in repeat visits the same webpages.

BRIEF DESCRIPTION OF THE DRAWINGS

FIG. 1 is a system architecture diagram of the present invention.

DETAILED DESCRIPTION OF IMPLEMENTIONS

This section uses a news site as an example. The backend operation process for a user to visit the news site twice is described in the framework provided by the invention.

Referring to FIG. 1, the cloud server periodically prefetches resources of the site. When users first visit the site, the browser sends the first HTML request to the proxy server on the mobile terminal. Because HTML is a most frequently updated resource, the default status at the mobile-terminal side is that a previous cache is unavailable, the proxy initiates a request to the server. After the proxy server resolves the URL, the proxy server initiates a query to the cloud server. Since the cloud server has previously retrieved the resource, the cloud server can retrieve the resource according to the URL. Afterwards the server attempts to retrieve the resource from the resource list in the mobile-terminal side. Because the mobile terminal has not visited the site previously, the resource does not exist on the mobile-terminal side. So the cloud server compresses the resource, and returns it to the proxy server on the mobile terminal. The proxy server parses the content returned by the cloud server and organizes it into an HTTP response and sends it back to the browser. The browser parses the HTML content and sends a request to the remaining resources to the proxy services. Because the mobile terminal has not visited the website before, the remaining resources are not cached locally. The cached resources similar to the resource also cannot be calculated using URL matching algorithm. Thus, the mobile terminal proxy service also requests these resources from the cloud server.

At a second visit to the website, the browser again sends HTML request to the proxyserver on the mobile-terminal side. The mobile terminal sends the resource request to the cloud server. The cloud server retrieves the resource locally, and then retrieves from the resource list cached on the mobile terminal using the checksum value. If the HTML content itself has not changed, the checksum value of the resource will exist in the cached resource list on the mobile terminal. The resource itself will not be returned. Otherwise, the entire resource needs to be returned to update the cached resource list on the mobile-terminal side.

For some resource parsed out by HTML, although the mobile terminal does not include cache data corresponding to the URL, but the change to the URL may be due to the dynamic resolution of the resulting web page, the resource itself has not changed. The URL matching algorithm can detect changes to such resource URLs and returns corresponding cached resources. If the algorithm determines that the relevant resources can not be found, the mobile terminal still needs to send the request to the server for inquiry.

When the mobile terminal sends a resource request to the cloud server, or if after the cloud server requests or retrieves the resource, it is found that the resource discovery checksum value corresponding to the resource already exists in the resource list on the mobile terminal, it does not return to the resource itself; it only returns a response header and a checksum value to the mobile terminal. The mobile terminal receives the information, and then extracted the body of the resource locally. The mobile terminal recombines both the resource head and the response body according to the corresponding structure of HTTP, and sends the content to the browser.

What is claimed is:

1. A method for optimizing resource loading of mobile browser based on cloud-end collaboration, comprising:
   1) establishing a proxy server on a user's mobile terminal and setting up a cloud server on the personal cloud of the user;
   2) receiving and resolving the URL request from the browser by the proxy server; if the proxy server has cached the URL request corresponding to the resource, or a corresponding existing resource has been calculated by a URL matching algorithm, returning the resource directly to the browser; if the resource is not stored locally, the URL request is sent to the cloud server, wherein the cloud server returns the resource and associated URL and a paragraph key coefficient associated with the URL to the proxy server, wherein the paragraph key coefficient is a probability value that remains constant for the resource, wherein the paragraph key coefficient is (number of occurrences of a paragraph)/(a total number of URLs corresponding to the resource+1);
   3) checking whether the cached URL request corresponding to the resource by a cloud server; returning the resource to the proxy server if the resource is cached; otherwise requesting the resource at a target web site corresponding to the URL and returning the result to the proxy server; and
   4) sending the returned result received by the proxy server back to the browser in accordance with the HTTP response structure.

2. The method of claim 1, wherein the cloud server is a virtual machine.

3. The method according to claim 1, wherein when the proxy server receives a URL request, the proxy server performs a matching query, compares the URL with records of all URL records of the corresponding website to find a best match, wherein the cache resource corresponding to a URL record exceeding a preset threshold is returned to the browser.

4. The method of claim 1, wherein the cloud server is configured to calculate a checksum value of the acquired resource and to store the resource and the checksum value in a database.

5. The method of claim 1, further comprising:
   generating, by the cloud server, a resource list of the user according to the user's visiting habits,
   performing resource prefetching according to the resource list; and
   storing the pre-fetched resource and a checksum value in a database.

6. The method of claim 5, further comprising:
   before returning the resource by the cloud server to the proxy server on the mobile terminal, checking whether a checksum value corresponding to a resource exists in a resource list of the mobile terminal;
   if not, sending the resource and the checksum value to the proxy server on the mobile terminal; and
   if yes, returning a header of the resource and the checksum value of the resource; after the proxy server receives the resource header and the checksum value, locally extracting a resource body associated with the resource header; reconfiguring the response header and the resource body according to corresponding HTTP structure, which is sent to the browser.

* * * * *